United States Patent
Paya et al.

(10) Patent No.: US 7,562,211 B2
(45) Date of Patent: Jul. 14, 2009

(54) INSPECTING ENCRYPTED COMMUNICATIONS WITH END-TO-END INTEGRITY

(75) Inventors: Cem Paya, Seattle, WA (US); Opher Dubrovsky, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 78 days.

(21) Appl. No.: 11/259,868

(22) Filed: Oct. 27, 2005

(65) Prior Publication Data

US 2007/0260871 A1 Nov. 8, 2007

(51) Int. Cl.
*H04L 9/00* (2006.01)

(52) U.S. Cl. .................. 713/151; 713/153; 713/166; 713/182; 713/188; 380/277; 380/281; 726/11

(58) Field of Classification Search .............. 713/151, 713/166, 182, 153, 188; 726/11; 380/277, 380/281
See application file for complete search history.

(56) References Cited

U.S. PATENT DOCUMENTS

| | | | | |
|---|---|---|---|---|
| 5,896,499 A * | 4/1999 | McKelvey | .............. | 726/11 |
| 6,480,963 B1 * | 11/2002 | Tachibana et al. | .............. | 726/4 |
| 6,948,060 B1 * | 9/2005 | Ramanathan | .............. | 713/153 |
| 7,043,632 B2 * | 5/2006 | Chapman et al. | .............. | 713/153 |
| 7,228,432 B2 * | 6/2007 | Angelo et al. | .............. | 713/182 |
| 2002/0078153 A1 * | 6/2002 | Chung et al. | .............. | 709/204 |
| 2003/0002862 A1 * | 1/2003 | Rodriguez et al. | .............. | 386/125 |
| 2003/0223586 A1 * | 12/2003 | Green et al. | .............. | 380/283 |
| 2005/0076228 A1 * | 4/2005 | Davis et al. | .............. | 713/188 |
| 2005/0108518 A1 * | 5/2005 | Pandya | .............. | 713/151 |
| 2005/0177713 A1 * | 8/2005 | Sim | .............. | 713/151 |
| 2005/0182958 A1 * | 8/2005 | Pham et al. | .............. | 713/200 |
| 2005/0182966 A1 * | 8/2005 | Pham et al. | .............. | 713/201 |
| 2005/0210142 A1 * | 9/2005 | de Jong et al. | .............. | 709/228 |
| 2006/0212270 A1 * | 9/2006 | Shiu et al. | .............. | 702/188 |

* cited by examiner

*Primary Examiner*—Kambiz Zand
*Assistant Examiner*—Kari L Schmidt
(74) *Attorney, Agent, or Firm*—Woodcock Washburn LLP

(57) ABSTRACT

Encrypted communications between peers are inspected by a proxy server, for bugs, viruses, malicious software and the like, while the proxy server is prevented from modifying the encrypted communications. A proxy server functioning as a gateway processor between the peers includes a security processor. The security processor is coupled to one of the peers via a channel that is separate from the channel carrying the encrypted communications between the peers. Cryptographic keys needed to decrypt the encrypted communications are provided via the separate channel to the security processor prior to commencement of encrypted communications. The security processor monitors the encrypted communications. The security processor decrypts the monitored encrypted communications without perturbing the encrypted communications. The security processor decrypts the encrypted communications utilizing the previously provided cryptographic keys. The security processor inspects the decrypted communications. If any faults are found, the security processor provides appropriate notification.

18 Claims, 3 Drawing Sheets

INSPECTING ENCRYPTED COMMUNICATIONS WITH END-TO-END INTEGRITY

TECHNICAL FIELD

The technical field generally relates to encrypted communications and more specifically relates to inspecting encrypted communications.

BACKGROUND

It is not uncommon for network administrators to prohibit direct connectivity between the internal network and external networks (such as the Internet). Typically, connections are routed through a proxy server functioning as a gateway processor between the two networks. Processors within the internal network connect to the proxy server, and the proxy server provides communications to the external network on behalf of those internal network processors. Application firewalls are commonly implemented via proxy servers. Typically, when implementing a firewall, the proxy server is aware of the protocol being employed (for example email, instant messaging or web-page request) and inspects communications between the networks. By introducing this single choke-point the network administrator can exert control over network activity. For example the network administrator can disallow certain protocols, restrict web-browsing to comply with regulations, or log traffic for forensic purposes. This process breaks down however, when using a protocol that requires end-to-end encryption. A protocol requiring end-to-end encryption requires that information encrypted by a source remain encrypted until received by the destination. The widely used Secure Sockets Layer (SSL) protocol and the Transport Layer Security (TLS) protocol (referred to collectively as SSL/TLS) are examples of protocols used for providing secure communications via end-to-end encryption. When using a protocol requiring end-to-end encryption, the proxy server sees encrypted data. The firewall can not inspect the encrypted data.

An attempt to work around this problem effectively utilizes a proxy server to maintain two connections. On the internal network side, the proxy server impersonates the remote site of the external network side, and on the external network side, the proxy server impersonates the internal host of the internal network side. This mediation approach however, requires trust in the proxy server and destroys the end-to-end integrity provided by the SSL/TLS protocol. Neither endpoint can be certain that the data it received originated from the proper source because the proxy server can modify the data during the exchange. Also, this approach is computationally burdensome because of the processor-intensive cryptographic operations required. Further, this approach is incompatible with mutual authentication features (such as a client processor authenticating itself to a server processor) of the SSL/TLS protocol.

SUMMARY

Encrypted communications are inspected while maintaining the end-to-end encryption, such as required by the SSL/TLS protocol. In an exemplary embodiment, a proxy server functioning as a gateway processor between an intranet and the Internet, includes a security processor. The security processor is coupled to a host processor within the intranet via a channel that is separate from the communications channel carrying the encrypted communications between the networks. When initializing communications between the networks, the host processor provides the security processor the cryptographic key (or keys) needed to decrypt the encrypted communications. The security processor is coupled to the communications channel carrying the encrypted communications, such that the security processor can monitor the encrypted communications. The security processor decrypts the encrypted communications without perturbing the encrypted communications being carried over the communications channel between the networks. The security processor decrypts the encrypted communications utilizing the previously provided cryptographic key(s). The security processor inspects the decrypted communications. If any faults are found, the security processor notifies the host accordingly. For the sake of simplicity, the term "channel" as used herein also implies a logical channel. For example, the security processor and the host processor can be using the same physical channel (e.g., the same network cable, or the same wireless network infrastructure), and that physical channel can support multiple logical channels. Logical channels can be within the same physical channel, without interference therebetween.

BRIEF DESCRIPTION OF THE DRAWINGS

The foregoing and other objects, aspects and advantages will be better understood from the following detailed description with reference to the drawings, in which.

DETAILED DESCRIPTION OF ILLUSTRATIVE EMBODIMENTS

As described herein, encrypted communications adhering to the end-to-end encryption requirement of the SSL/TLS protocol can be inspected while preserving end-to-end integrity. Application to the SSL/TLS protocol is exemplary, and should not be limited thereto. For example, the methods, apparatuses, and systems described herein for inspecting encrypted communications are applicable more generally to all usage modes of the SSL/TLS protocol, or to any application involving inspection of encrypted information while maintaining end-to-end integrity.

Figure 1:
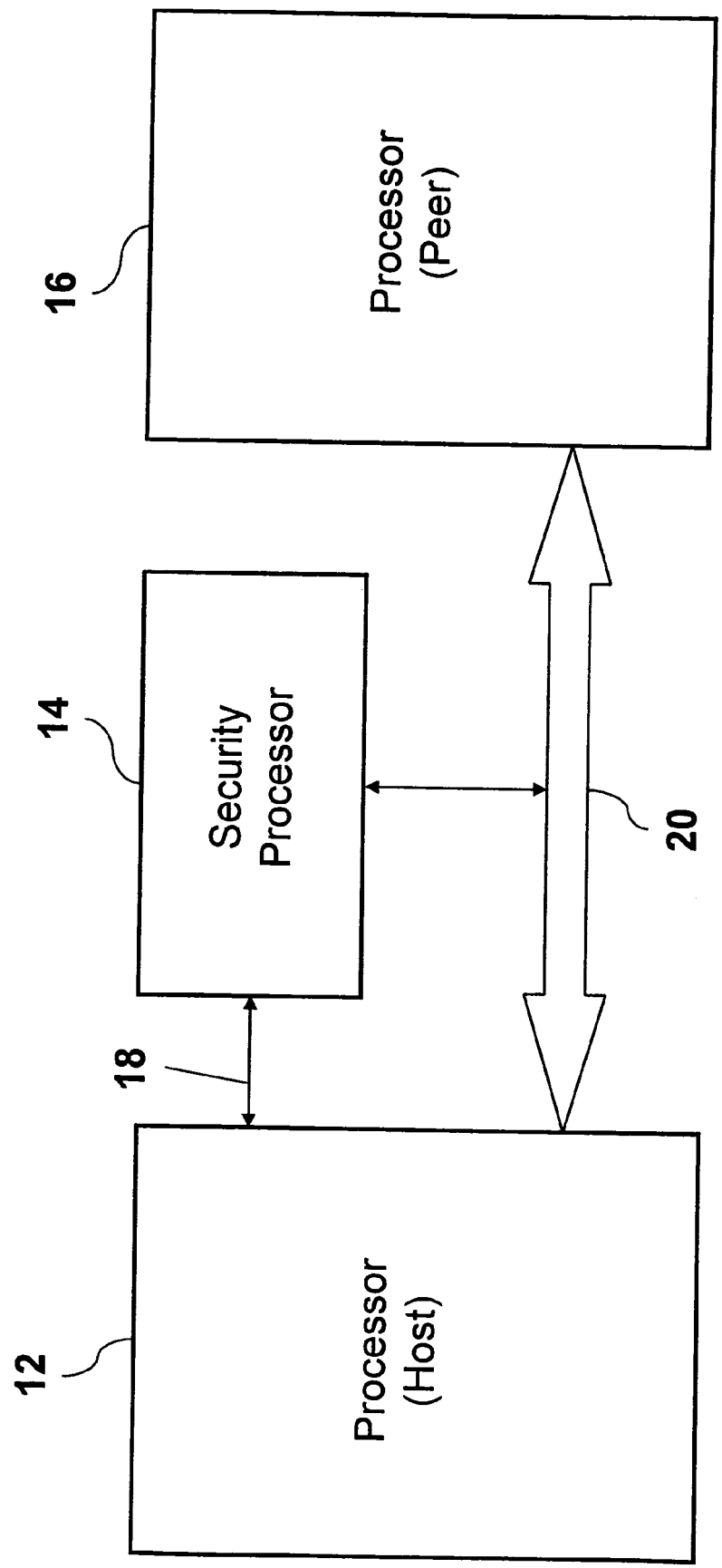
FIG. 1 is a diagram of an exemplary system for inspecting encrypted communications while maintaining end-to-end encryption.

FIG. 1 is a diagram of an exemplary system for inspecting encrypted communications while maintaining end-to-end encryption. The system depicted in FIG. 1 comprises a host processor 12, a security processor 14, and a peer processor 16. The host processor 12 can comprise any appropriate processor. For example, the host processor 12 can comprise a general purpose processor, a dedicated processor, a desktop computer, a laptop computer, a Personal Digital Assistant (PDA), a handheld computer, a smart phone, a server processor, a client processor, or a combination thereof. The host processor 12 can be implemented in a single processor or multiple processors. Multiple processors can be distributed or centrally located. Multiple processors can communicate wirelessly, via hard wire, or a combination thereof.

Similarly, the peer processor 16 can comprise any appropriate processor. The peer processor 16 can comprise a general purpose processor, a dedicated processor, a desktop computer, a laptop computer, a Personal Digital Assistant (PDA), a handheld computer, a smart phone, a server processor, a client processor, or a combination thereof. The peer processor 16 can be implemented in a single processor or multiple processors. Multiple processors can be distributed or centrally located. Multiple processors can communicate wirelessly, via hard wire, or a combination thereof.

And further, the security processor 14 can comprise any appropriate processor. The security processor 14 can comprise a general purpose processor, a dedicated processor, a desktop computer, a laptop computer, a Personal Digital Assistant (PDA), a handheld computer, a smart phone, a server processor, a client processor, or a combination thereof. The security processor 14 can be implemented in a single processor or multiple processors. Multiple processors can be distributed or centrally located. Multiple processors can communicate wirelessly, via hard wire, or a combination thereof.

The security processor 14 communicates with the host processor 12 via interface 18. The interface 18 can comprise any appropriate interface such as a wireless interface (e.g., rf, optical), a wired interface (e.g., hard-wired, docking station, USB compatible interface), or a combination thereof. The interface 18 can comprise intermediate processors for providing communications between the security processor 14 and the host processor 12. The peer processor 16 communicates with the host processor 12 via interface 20. The interface 20 can comprise any appropriate interface such as a wireless interface (e.g., rf, optical), a wired interface (e.g., hard-wired, docking station, USB compatible interface), or a combination thereof. The interface 20 can comprise intermediate processors for providing communications between the peer processor 16 and the host processor 12.

The interface 18 comprises a channel for the host processor 12 to provide cryptographic keys to the security processor 14. In an exemplary embodiment, the interface 18 is a secure channel such that cryptographic keys carried over the interface 18 are protected. The interface 18 is separate from the interface 20. It is envisioned that there is no crosstalk between the interface 18 and the interface 20. The interface 20 is a communications channel for carrying communications between the host processor 12 and the peer processor 16. In an exemplary embodiment, the interface 20 carries encrypted information between the host processor 12 and the peer processor 16. The processor 12, the security processor 14, and the peer processor 16 can be within a single network, or can be distributed throughout any number of networks.

Figure 2:
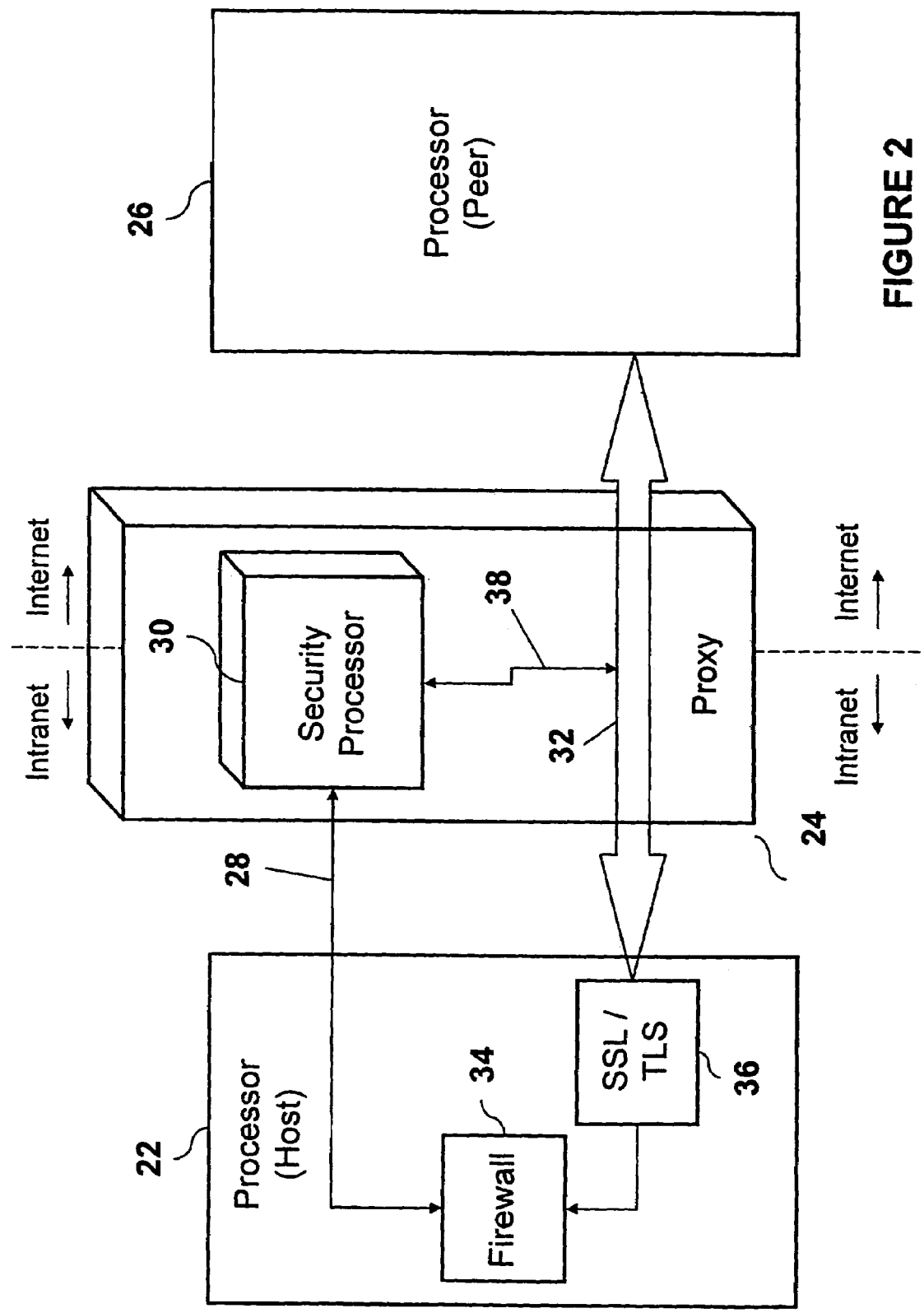
FIG. 2 is a diagram of an exemplary system for inspecting encrypted communications while maintaining end-to-end encryption between networks.

FIG. 2 is a diagram of an exemplary system for inspecting encrypted communications while maintaining end-to-end integrity between networks. FIG. 2 represents a more specific exemplary implementation of the system depicted in FIG. 1. It is to be understood that where appropriate, descriptions pertaining to FIG. 2 also apply to FIG. 1. For example, the host processor 22 is analogous to the host processor 12 and descriptions pertaining to the host processor 22 can be appropriately applied to the host processor 12. The peer processor 26 is analogous to the peer processor 16 and descriptions pertaining to the peer processor 26 can be appropriately applied to the peer processor 16. The security processor 30 is analogous to the security processor 14 and descriptions pertaining to the security processor 30 can be appropriately applied to the security processor 14. The interface 32 is analogous to the interface 20 and descriptions pertaining to the interface 32 can be appropriately applied to the interface 20. And, the interface 28 is analogous to the interface 18 and descriptions pertaining to the interface 28 can be appropriately applied to the interface 18.

The system depicted in FIG. 2 shows the host processor 22 within an internal network labeled as an intranet and the peer processor 26 within an external network labeled as the Internet. The security processor 30 is part of the proxy server 24. The proxy server 24 is a gateway between the two networks. The proxy server 24 is capable of controlling communications between the peer processor 26 and the host processor 22 via the interface 32. The interface 32 performs the same functions as the interface 20 described above and the interface 28 performs the same functions as the interface 18 as described above.

In an exemplary scenario, the host processor 22 residing in an intranet communicates with the peer processor 26 residing in the Internet via an encrypted connection via the interface 32 in compliance with the end-to-end encryption requirements of the SSL/TLS protocol. In this exemplary scenario, the host processor 22 initiates communications with the peer processor 26 to establish the connection between the host processor 22 and the peer processor 26. The host processor 22 contacts the proxy server 24 to establish an outbound connection to the Internet. The SSL connection can be initiated by the host, and can also be initiated by the peer processor. Generally, a TLS/SSL module does not handle network communications, but rather deals with generating and/or decoding messages as abstract data, without reference to a communication channel or storage medium. Typically, TLS/SSL is utilized in conjunction with some other component that knows how to utilize network protocols. In an exemplary embodiment, the host processor 22, via SSL/TLS module 36, sends information about the protocol to be utilized and other required parameters to the proxy server 24. The SSL/TLS module 36 comprises a software, firmware, and/or hardware module for communicating with the proxy server 24 to establish and maintain communications in accordance with the SSL/TLS protocol. The SSL/TLS module 36 is exemplary. Any appropriate module, or other means, can be implemented to establish and maintain communications in accordance with any appropriate protocol.

As part of the initiation, the proxy server 24 recognizes that the connection will be an encrypted connection requiring end-to-end encryption between the host processor 22 and the peer processor 26. The host processor 22, via the SSL/TLS module 36, proceeds to provide SSL/TLS handshaking messages to the proxy server 24 to establish the cryptographic keys needed to encrypt, decrypt, and/or authentic the communications to be carried over the interface 32. The SSL/TLS module 36 provides the cryptographic key (or keys) needed for decryption to the security processor 30, via the firewall module 34 (if implemented). The firewall module 34 is exemplary. The firewall module 34 can comprise software, firmware, and/or hardware to facilitate providing communications through the proxy server 24. If a firewall is not implemented, then the cryptographic key(s) is provided to the security processor 30 without going through the firewall module 34.

In an exemplary embodiment, multiple proxy servers are provided with multiple sets of cryptographic keys, for providing encrypted communications between the host processor 22 and multiple peer processors. The multiple peer processors can reside in a single network or in any combination of multiple networks.

When the cryptographic key(s) is provided to the security processor 30, in an exemplary embodiment, the host processor 22 provides proof of the correctness of the provided cryptographic key(s). Proof of correctness can be accomplished by any appropriate means. For example, an exemplary process for proving correctness of the cryptographic key(s) utilizing SSL version 3 is described below. This process verifies that the encryption key provided by the peer (client) is correct, before it begins forwarding any application level traffic. The proof occurs during the last stage of the handshake process. In this final stage, both peers (client and host) send the commonly referred to "Finished" message. The Finished message is the first message encrypted with the keys recently negotiated during the handshake process. In the case of SSL version 3 the message contains two values, as shown below:

MD5_hash=MD5(MasterSecret‖Pad2‖MD5(handshake-messages‖sender‖MasterSecret‖Pad1))

SHA1_hash=SHA1(MasterSecret‖Pad2‖SHA1(handshake-messages‖sender‖MasterSecret‖Pad1))

MD5 and SHA1 are well-known cryptographic hash algorithms, Pad1 is a padding string consisting of the byte 0x36 repeated 40 (48 for SHA1) times, Pad2 is a padding string consisting of the byte 0x5c repeated 40 times (48 for SHA1) and the ‖ symbol denotes concatenation. Because MD5 and SHA1 are iterative block-based hash functions, the above can be written as:

MD5_hash=MD5(IV-1, X-1)

SHA1_hash=SHA1(IV-2, X-2)

Where X−1 is a 16 byte value, X−2 is a 20 byte value and IV−1, IV−2 are initialization vectors defining the initial state of the hash function. MD5 and SHA1 algorithms both specify an IV but here, different initial-states are initialized when running the functions. X1 and X2 are the inputs to that modified hash function.

As proof procedure, the client is typically requested to provide the values IV−1, IV−2, X1 and X2. In principle either of the sets <IV−1, X1> or <IV−2, X2> is by itself sufficient. Either pair or both can be requested. In an exemplary implementation, only <IV−2, X2> would be requested because SHA1 is the stronger hash function. If the client provides an incorrect decryption key to the server, the decrypted values for MD5_hash and SHA1_hash in the Finished message will be random. Because MD5 and SHA1 algorithms are designed to be non-invertible, the client will then be unable to come up with the correct pair of initialization vector and input yielding a hash value matching what was found in the decrypted Finished message.

After the handshake process is complete, the client provides a proof of correctness for each key escrowed. For example, if only inbound traffic is inspected (e.g., only traffic originating from remote peer, destined for a host on the internal network) then the client provides the pair <IV, X> corresponding to the Finished message in that direction (Recall that a finished message is sent by both peers.). Until this proof is provided, no packets arriving from the remote peer intended for the client on that connection will be forwarded. The client can be allowed to send outbound packets, but any incoming packets will be queued for future delivery once the proof is complete. When the <IV, X> pair is received, the following occurs:

1. Use the decryption key given by the client earlier to decrypt the incoming Finished message and extract the MD5/SHA1 hashes from this message.
2. Compute one or both hashes using the alternative formula above and supplied <IV, X> pair.
3. Compare the values in step #1 and step #2. If they are identical, the decryption key is correct with high probability.

Similarly in the other direction, if a policy calls for inspection of outbound traffic, the client provides the matching pair <IV, X> corresponding to the Finished message it sends out. Verification proceeds as described above. Outbound packets on that connection are queued until proof is complete, but inbound traffic can be allowed to pass through.

After all necessary decryption keys are provided to the security processor 30, and the security processor 30 verifies the optional proof, encrypted communications between the host processor 22 and the peer processor 26 via the interface 32 commences. As encrypted communications are being carried over the interface 32, the security processor 30 monitors the encrypted communications (also referred to as traffic) via interface 38. The security processor 30 and the interface 38 are implemented so that the encrypted communications over the interface 32 is not perturbed when monitored. As used herein, "not perturbed" means that the peer processor receives the exact data provided by the host processor or that the host processor receives the exact data provided by the peer processor. This is in contrast to the mediation approach described above wherein data is recreated. The security processor 30 decrypts the monitored encrypted communications, again ensuring that the encrypted communications being carried over the interface 32 is not perturbed. The security processor 30 inspects the decrypted information for any faults such as bugs, viruses, malicious software, or the like. If faults are detected, the security processor 30 notifies the host processor of the fault, and the host processor can take appropriate action. In an exemplary embodiment, when a fault is detected, the proxy processor can prevent the flow of encrypted communications to the host processor.

In an exemplary embodiment, encrypted communications being carried over the interface 32 comprise encrypted information and an encrypted authenticator indicative of the authenticity of the encrypted information. In one embodiment, information is encrypted with a different key than is used to encrypt the authenticator. In another embodiment, the authenticator comprises a hash value encrypted with the same key or a different key than the key used to encrypt the information. In an exemplary embodiment, the security processor 30 receives the key (or keys) necessary to decrypt the encrypted information and the security processor 30 is not provided the encryption key(s) needed to encrypt the authenticator. Thus, even if the key(s) provided to the security processor 30 were attempted to be used to corrupt the encrypted communications over the interface 24, the encrypted authenticator would remain valid. And, upon proper decryption of the encrypted authenticator, any attempt to corrupt the encrypted communications would be detected.

Figure 3:
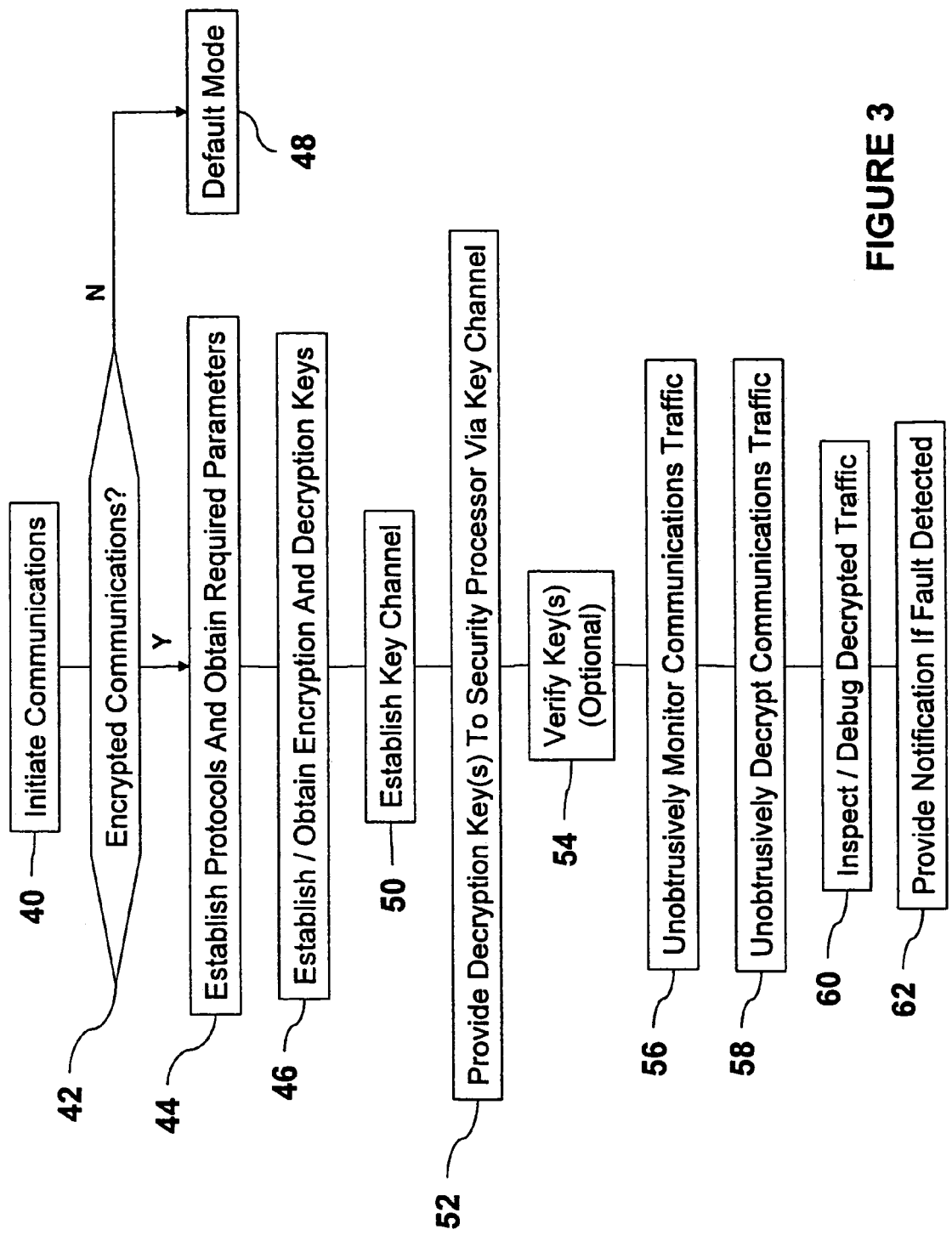
FIG. 3 is a flow diagram of an exemplary process for inspecting encrypted communications.

FIG. 3 is a flow diagram of an exemplary process for inspecting encrypted communications. Communications are initiated at step 40. For example, communications can be initiated between the host processor 12 and the peer processor 16, or between the host processor 22 and the peer processor 26. It is determined at step 42 if the communications is to require end-to-end encryption. If encryption is not required, the communication can proceed in a predetermined manner at step 48. If it is determined (step 42) that encrypted communications are to take place, protocols are established and required parameters are obtained at step 44. The necessary decryption and encryption keys are established at step 46. A channel for providing cryptographic keys is established at step 50. This channel can comprise, for example, the interface 18 of the interface 28. In an exemplary embodiment, this channel is used to provide a decryption key (or keys) to a security processor, such as security processor 14 or security processor 30 for example. The decryption key(s) are provided to the security processor at step 52. Optionally, proof of correctness of the provided key(s) is provided and verified at step 54. The encrypted communications (via interface 20 or interface 32, for example) is monitored at step 56. The encrypted communications are not perturbed by the monitoring process (unobtrusively monitored) at step 56. The monitored encrypted communications is decrypted at step 58. The encrypted communications are not perturbed by the decryption process (unobtrusively decrypted) at step 58. The decrypted communications are checked for any faults, such as bugs, errors, viruses, malicious software, or the like at step 60. If a fault is detected, appropriate notification is provided at step 62. In another exemplary embodiment, if a fault is detected communication traffic is blocked altogether, at step 62.

The various techniques described herein may be implemented in connection with hardware or software or, where appropriate, with a combination of both. Thus, the methods and apparatuses for inspecting encrypted information or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for inspecting encrypted information. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language may be a compiled or interpreted language, and combined with hardware implementations.

The methods and apparatuses for inspecting encrypted information also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for inspecting encrypted information. When implemented on a general-purpose processor, the program code combines with the processor to provide a unique apparatus that operates to invoke the functionality for inspecting encrypted information. Additionally, any storage techniques used in connection with inspecting encrypted information can invariably be a combination of hardware and software.

Inspecting encrypted information while maintaining encryption end-to-end integrity as described herein provides a means for an intermediary to view encrypted communications and be prevented from altering the encrypted communications. If desired, the intermediary can view and modify traffic flow in one direction only, thus providing enhanced privacy and integrity. The processing time needed to decrypt the encrypted communications is less than the processing time needed to decrypt the encrypted communications and subsequently encrypt the decrypted communications.

Further, inspecting encrypted information as described herein can be implemented using symmetric key cryptographic techniques. And, the SSL/TLS decrypt/re-encrypt approach requires Public-Key cryptographic techniques, which are on the order of 100 times more computationally intensive than symmetric key cryptographic techniques. Trust in the proxy server is limited because the proxy server can not modify messages originating from either the host processor or the peer processor. The proxy server has read-access to the traffic, but does not have write-access to the traffic. Read access means the ability to decrypt encrypted traffic. When all network traffic between the peers is passing through the proxy, that proxy can always see encrypted traffic. But without the key disclosed, the proxy can not decrypt to access the plaintext, which is what is meant by read access. Similarly the proxy can substitute different traffic instead of forwarding between peers, but the authenticator will not match. Thus, unless the proxy is given the correct key, the peer will reject such modifications. Further, giving write access means giving the authenticator key so that the proxy can make changes to the traffic that will be accepted by that peer.

The system can be configured in many different ways. For example, the proxy server can be given either read access or read/write access to outbound traffic, depending on whether the client discloses the encryption key only, or both the encryption/authenticator keys respectively. Similarly the proxy server can be given read access or read/write access to inbound traffic depending on whether one or both keys are disclosed.

In an exemplary embodiment, the owner of the internal network is concerned with preventing bugs, viruses, malicious software, and the like from entering the internal network. Thus, the security process can be implemented to decrypt only incoming traffic. This implementation complies with the known principle of least privilege and prevents the proxy server from decrypting outgoing traffic.

Further, inspecting encrypted information while maintaining encryption end-to-end integrity as described herein prevents disclosure to an inspector of sensitive authentication material, such as passwords, because the security processor can be prevented from seeing the outgoing traffic. Inspecting encrypted information while maintaining encryption end-to-end integrity as described herein is applicable in situations wherein mutual authentication is needed between the host and peer processors. Also, a system is envisioned in which the host processor approves giving keys to the security processor. The host processor thus is aware of the traffic being inspected, as well as being provided a choice to decline inspection (and suffer the consequences of the policy applied if it does not agree to the inspection).

While methods and apparatuses for inspecting encrypted information have been described in connection with the illustrative embodiments of the various figures, it is to be understood that other similar embodiments may be used or modifications and additions may be made to the described embodiments for performing the same function for inspecting encrypted information without deviating therefrom. Therefore, methods and apparatuses for inspecting encrypted information should not be limited to any single embodiment, but rather should be construed in breadth and scope in accordance with the appended claims.

What is claimed:

1. A method for inspecting encrypted communications, said method comprising:
  establishing a first communications channel for transporting end-to-end encrypted data between a first processor and a second processor, the first communications channel configured to expressly preclude the insertion of a decrypting element on the first communications channel between the first and second processors;
  tapping the first communications channel with a second communications channel for coupling a security processor to the first communications channel; and
  using the security processor for monitoring the end-to-end encrypted data carried over the first communications channel, the security processor configured to prohibit a mediation operation between the first and second processors, wherein the mediation operation comprises a decryption followed by a re-encryption of the end-to-end encrypted data carried over the first communications channel.

2. A method in accordance with claim 1, further comprising notifying the first processor if a fault is found as a result of said monitoring.

3. A method in accordance with claim 1, further comprising:
providing at least one cryptographic key to the security processor wherein said at least one cryptographic key is capable of utilization for decrypting encrypted information contained in the end-to-end encrypted data; and
wherein said at least one cryptographic key is incapable of utilization by the security processor for decrypting an encrypted authenticator contained in the end-to-end encrypted data, thereby denying the security processor a capacity for corrupting said encrypted information contained in the end-to-end encrypted data.

4. A method in accordance with claim 3, wherein said at least one cryptographic key is provided to the security processor over a third communications channel that is independent of the first and the second communications channels.

5. A method in accordance with claim 3, wherein the encrypted information is encrypted using a first cryptographic key and the encrypted authenticator is encrypted using a second cryptographic key that is different than the first cryptographic key; and wherein the at least one cryptographic key provided to the security processor is solely the first cryptographic key.

6. A method in accordance with claim 1, wherein said encrypted communications is in compliance with at least one of a secure sockets layer protocol and a transport layer security protocol.

7. A method in accordance with claim 1, wherein said first processor is located in an intranet and said second processor is located in the Internet.

8. A system for inspecting encrypted communications, said system comprising:
a first communications channel for transporting said encrypted communications between a first processor and a second processor, the first communications channel configured to preclude the insertion of a decrypting element on the first communications channel between the first and second processors;
a second communications channel for transporting at least one cryptographic key to a security processor, wherein said second channel is separate from said first logical communications channel; and
a security processor coupled via a third communications channel that taps into the first communications channel, for monitoring said encrypted communications between said first processor and said second processor, the security processor configured to prohibit a mediation operation between the first and second processors, wherein the mediation operation comprises a decryption followed by a re-encryption of said encrypted communications carried over the first communications channel.

9. A system in accordance with claim 8, said system further comprising:
a proxy server operable as a gateway between said first processor and said second processor, wherein:
said proxy server housing said security processor;
said proxy server allows said encrypted communications via said first communications channel to be carried therethrough; and
said security processor is coupled to said first communications channel via said third communications channel that is located within said proxy server.

10. A system in accordance with claim 8, wherein said first processor is a host processor; and said security processor notifies said host processor if a fault is found as a result of monitoring said decrypted communications.

11. A system in accordance with claim 8, wherein said encrypted communications is in compliance with at least one of a secure sockets layer protocol and a transport layer security protocol.

12. A system in accordance with claim 8, wherein:
said first processor comprises a component within a first network;
said second processor comprises a component within a second network; and
said second communications channel is within said first network.

13. A system in accordance with claim 8, wherein:
said encrypted communications comprise encrypted information and an encrypted authenticator;
said at least one cryptographic key is capable of utilization for decrypting said encrypted information;
said at least one cryptographic key is incapable of utilization for decrypting said encrypted authenticator; and
said at least one cryptographic key is incapable of utilization for forging said encrypted authenticator.

14. A security processor comprising:
means for receiving at least one cryptographic key via a first channel, said first channel being within a first network;
means for monitoring encrypted communications being carried over a second channel, said first channel being separate from said second channel, said second channel carrying said encrypted communications between said first network and a second network; and
means for decrypting with said at least one cryptographic key said encrypted communications being carried over said second channel, the means for decrypting configured to preclude a mediation operation between the first and second networks, wherein the mediation operation comprises a decryption followed by a re-encryption of said encrypted communications carried over said second channel.

15. A security processor in accordance with claim 14, wherein said encrypted communications is in compliance with at least one of a secure sockets layer protocol and a transport layer security protocol.

16. A security processor in accordance with claim 14, wherein:
said encrypted communications comprise encrypted information and an encrypted authenticator;
said at least one cryptographic key is capable of utilization for decrypting said encrypted information;
said at least one cryptographic key is incapable of utilization for decrypting said encrypted authenticator; and
said at least one cryptographic key is incapable of utilization for forging said encrypted authenticator.

17. A security processor in accordance with claim 14, wherein:
said security processor is a component contained in a proxy server; and
said proxy server functions as a gateway between said first network and said second network.

18. A security processor in accordance with claim 14, said security processor further comprising means for providing notification of a fault discovered as a result of inspecting said decrypted communications.

* * * * *